Dec. 27, 1966    P. H. NELSON    3,294,992
END LOADING BATTERY HOLDER FOR APPLIANCE
Filed Feb. 26, 1964
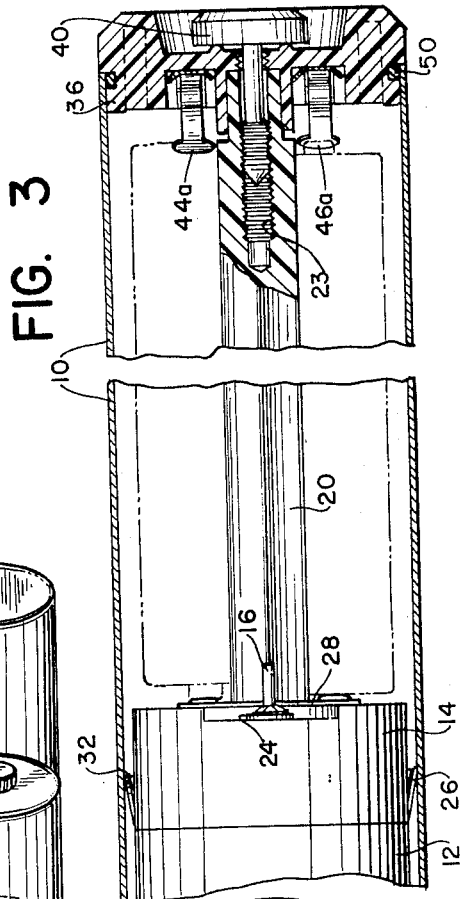
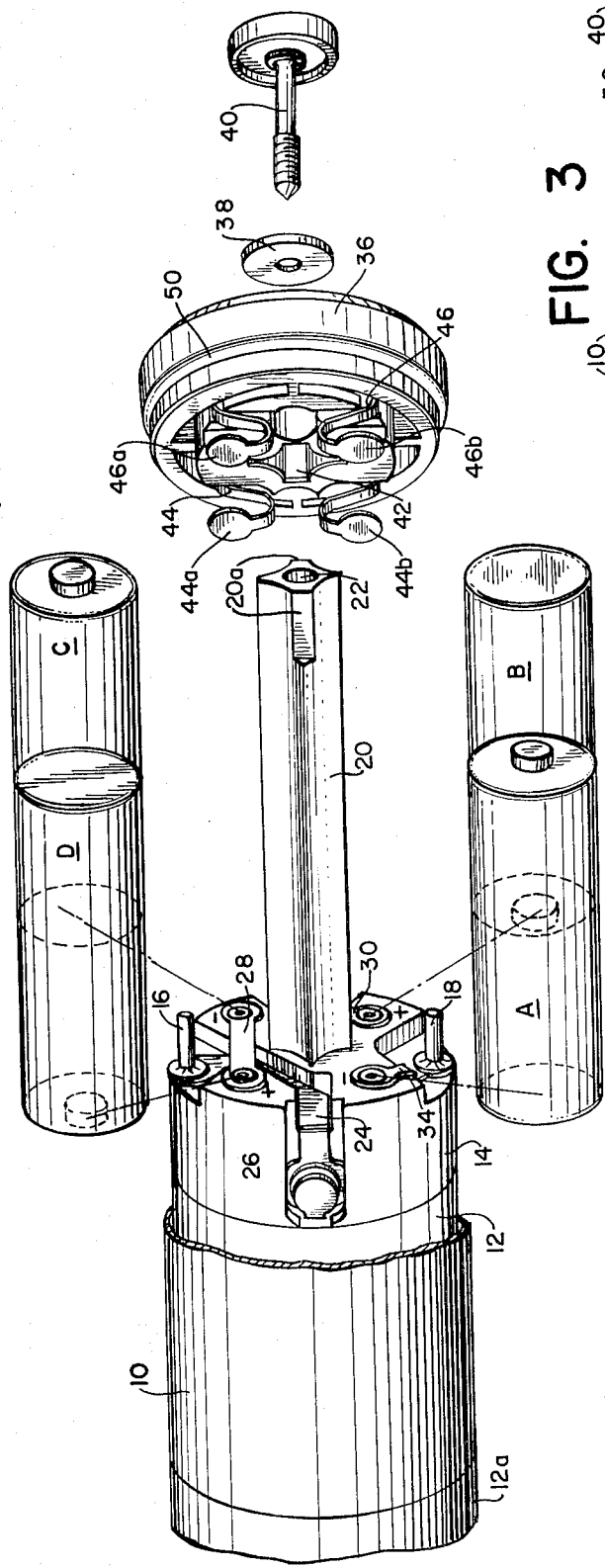
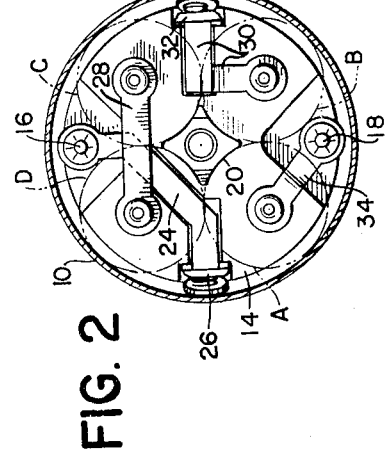
INVENTOR.
PAUL H. NELSON
BY  *Darby & Darby*
ATTORNEYS

United States Patent Office 3,294,992
Patented Dec. 27, 1966

3,294,992
END LOADING BATTERY HOLDER
FOR APPLIANCE
Paul H. Nelson, Plainville, Conn., assignor, by mesne assignments, to General Electric Company, Bridgeport, Conn., a corporation of New York
Filed Feb. 26, 1964, Ser. No. 347,457
6 Claims. (Cl. 310—68)

This invention comprises a construction for facilitating the mounting and replacement of dry cells used in the operation of electric appliances, such as, for example, an electric toothbrush.

One object of the invention is to provide a holder for dry cells which may be loaded from one end and which is constructed so as to facilitate the correct positioning of the dry cells, to insure series connection.

A more general object is to provide a simple structure of this type which is easily mass produced at low cost.

Other and more detailed objects of the invention will be apparent from the following disclosure of the single embodiment of the invention selected for illustrative purposes.

In the accompanying drawings:

FIGURE 1 is an exploded view in perspective of the battery holder of this invention;

FIGURE 2 is a right-hand view of the holder with the closure cap removed and the battery positions indicated diagrammatically;

FIGURE 3 is a longitudinal cross-sectional view through the holder as finally assembled.

Since the battery holder of this invention is of general application, the details of the appliance to be energized thereby have been omitted. The disclosure, however, will be related to the use of the holder as applied to an electric toothbrush. The output shaft, the power transmission and the operating motor are not shown, although these parts are assembled into a unit, the end of which is diagrammatically illustrated at 12.

Secured to the end of the unit is an insulating base 14 which is provided with a central axially extending post 20. The base and post, for example, may be molded as a single piece from any suitable plastic insulating material. The unit 14–20 is secured, as illustrated, to the end of the appliance unit 12 by means of a pair of metal pins 16 and 18, which serve also as the contacts for the on and off switch for the motor, neither of which is shown.

One form of device employing these features is shown in full detail in the copending application of Allen H. Kent, Serial No. 215,161, now Patent No. 3,196,298, filed August 6, 1962, for Hand Portable Power Unit.

It will be apparent that the fastening pins 16 and 18, which hold the base 14 to the power unit 12, need not form the contacts for the switch.

As clearly shown in FIGURE 1, the cross-sectional form of the post 20 is diamond shaped with its defining faces curved, see particularly FIGURE 2. An opposite pair of edges of the post at the end, see FIG. 1, are formed flat, as indicated at 20a. The end of the post is counterbored and internally threaded, as indicated respectively at 22 in FIG. 1 and 23 in FIG. 3.

In the form illustrated the brush holders for the motor, which are broadly the terminals of the motor; are mounted in the base 14 at 26 and 32.

Metal strip 24 electrically connects the pin 16 to the brush holder 26. Mounted on the exposed face of the base 10 is a metal strap 28. The other brush holder 32 is electrically connected by means of an L-shaped metal strap 30, also secured on that face. The pin 18 is provided with a metal strap 34, also secured on the exposed face of the base. Each of the straps 28, 30 and 34 terminate in four equidistant ends positioned circumferentially 90° apart, as is clear from FIG. 2.

The external diameters of the unit 12 and the base 14 are the same and have a slightly less diameter than the internal diameter of a tubular casing 10, which has a sliding fit with a shoulder on the head end 12a of the power unit. This detailed construction is not essential to this invention, although its exact form can be found in the above mentioned copending application. The open end of the casing 10 is closed by means of an insulating cap 36, which is secured in place by means of a screw 40 having a threaded end to cooperate with the threads 23 in the counter-bore of the post. The head of the screw 40 is recessed to receive a sealing washer 38 which rests on an annular rib formed on the cap, see FIG. 3. The interior face of the cap is formed with a complementarily shaped recess 42 to receive the end of the post 20 and act as an indexing means.

Molded or releasably secured in the cap are a pair of generally U-shaped conductor straps 44 and 46 made of a springy metal. The ends of the arms of the strap 44 are reversely bent outwardly to form aligned contacts 44a and 44b. The same formation is used for the strap 46 to provide the contact terminals 46a and 46b.

The cap is formed to receive a sealing ring 50 to prevent the entry of moisture into the casing 10, see FIG. 3.

As illustrated, the holder is adapted to contain four dry cells, A, B, C and D. To facilitate the proper positioning of the dry cells by one unfamiliar with electrical theory, the face of the base 14 is alternatively provided with the plus and minus symbols consecutively related to the terminal ends of the straps 28, 30 and 34, so that the batteries can be properly positioned, as diagrammatically illustrated in FIGS. 1 and 2.

Attention is drawn to the fact that the internal diameter of the casing 10 and the cross sectional dimension of the post 20 insures the accurate positioning of the dry cells, see particularly FIG. 2.

After the insertion of the batteries the cap 36 is positioned and locked in place by means of the screw 40. The U-shaped contact straps 44 and 46 are arranged in a symmetrical pattern in relation to the diamond-shaped aperture 42 so that the cap can be applied to the post 20 in either of two positions, displaced 180°. In either of these positions these straps will interconnect the adjacent ends of the batteries A, B, C and D.

Electrically the series circuit consists of pin 16, straps 24, brush holder 26, through the motor to brush holder 32, strap 30, battery B, strap 46, battery C, strap 28, battery D, strap 44, battery A, strap 34 and pin 18. To complete this circuit the switch, not shown, (see said copending application) is actuated so as to interconnect the pins 16 and 18, thus energizing the motor.

Another feature of the invention is found in the fact that the threaded end of the screw 40 is of such length that it will abut against the cap if the screw is withdrawn, to aid in forcing the cap free of the end of the casing 10, thereby overcoming the friction of the sealing ring 50. This ejection of the cap is aided by the fact that the spring straps 44 and 46 are compressed when the cap is fully seated. As the pressure of the screw 40 is let off, these springs aid in pushing the cap outwardly.

From the above description it will be apparent to those skilled in the art that the exact details of the structure selected for illustrative purposes are capable of some variation without departure from the novel subject matter herein disclosed. It is maintained, therefore, that the scope of protection afforded is to be determined by the appended claims.

What is claimed:
1. A battery holder for an electric motor operated ap- pliance in combination with a power unit, including an electric motor having a pair of terminals, an insulator base having a concentric axial post, means for securing said base to said unit in axial alignment, a tubular casing concentric with said post and abutting said unit at one end, a closure cap for the other end of said casing, means for securing said cap to said post, and sets of conductor straps secured to said base and cap, to connect a plurality of dry cells in series with said terminals.

2. In the combination of claim 1, said securing means comprising a pair of metal members electrically connected to said terminals and arranged to form the contacts of a control switch.

3. In the combination of claim 1, said post having four concave sides, said dry cells being positioned by engagement with the interior of said casing and the sides of said post.

4. In the combination of claim 1, said cap fastening means comprising a screw having a threaded end engaging a threaded aperture in the end of said post.

5. In the combination of claim 1, said cap fastening means comprising a screw having a threaded end engaging a threaded aperture in the end of said post and the threaded end of said screw being shaped and positioned to abut said cap and force it outwardly before the threaded end disengages the threads in said aperture.

6. In the combination of claim 1, said cap having a recess to receive the end of said post, the cross sectional shape of said post and recess cooperating to rotationally position the cap.

References Cited by the Examiner
UNITED STATES PATENTS

| | | | |
|---|---|---|---|
| 2,963,598 | 12/1960 | Kent | 310—50 |
| 3,035,191 | 5/1962 | Kent | 310—50 |
| 3,196,299 | 7/1965 | Kott | 310—81 |

MILTON O. HIRSHFIELD, *Primary Examiner.*

J. D. MILLER, *Assistant Examiner.*